No. 608,034. Patented July 26, 1898.
W. E. FEROE.
FILTER FOR MALT BEVERAGES.
(Application filed Nov. 1, 1897.)

(No Model.) 2 Sheets—Sheet 1.

Witnesses
P. Farrington
Alexander Dow

Inventor:
William E. Feroe
By Irving Attorney

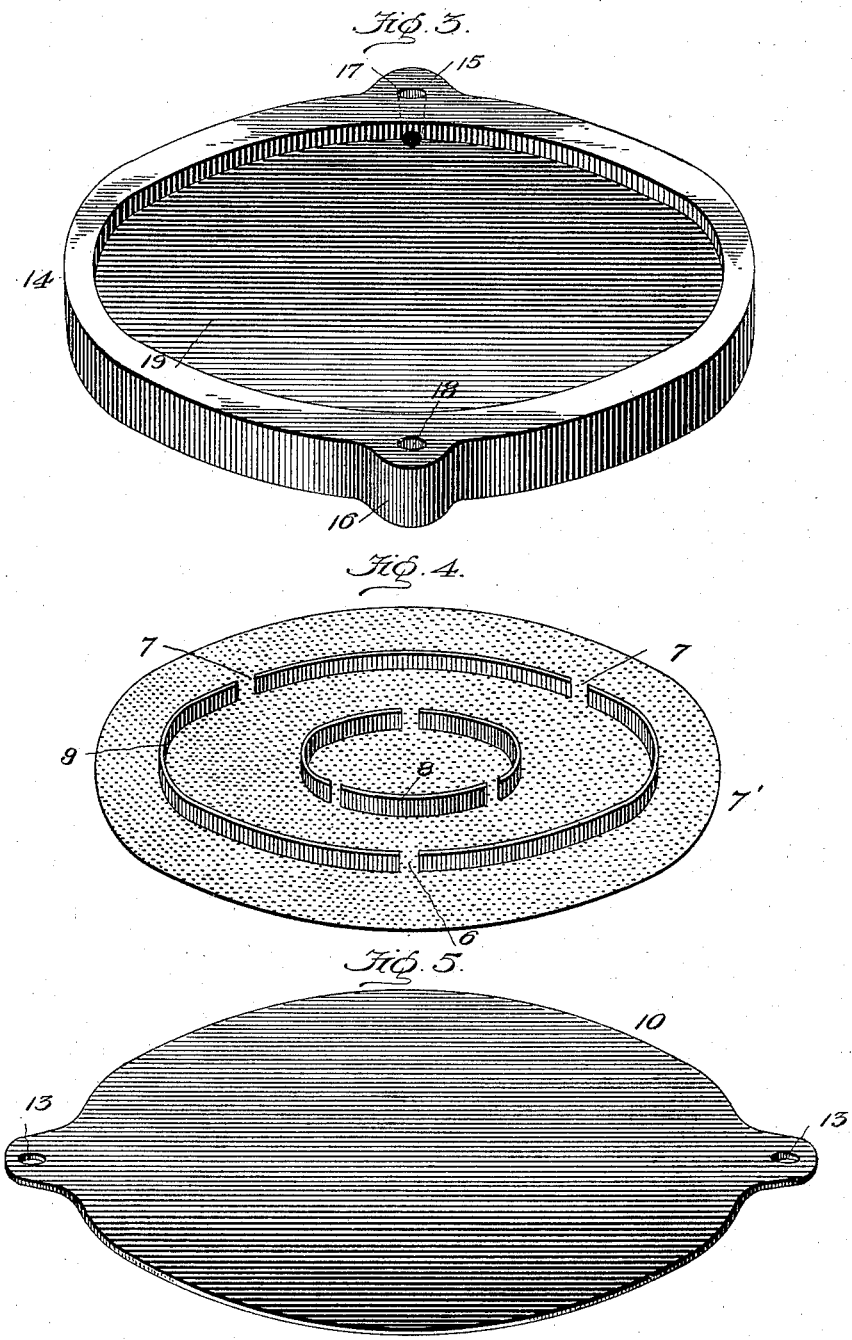

UNITED STATES PATENT OFFICE.

WILLIAM E. FEROE, OF MADOLIN, NEW YORK, ASSIGNOR TO THE PLATTSBURGH FILTER AND PROCESS COMPANY, OF PLATTSBURG, NEW YORK.

FILTER FOR MALT BEVERAGES.

SPECIFICATION forming part of Letters Patent No. 608,034, dated July 26, 1898.

Application filed November 1, 1897. Serial No. 657,023. (No model.)

*To all whom it may concern:*

Be it known that I, WILLIAM E. FEROE, a citizen of the United States, residing at Madolin, in the county of Dutchess and State of New York, have invented certain new and useful Improvements in Filters for Malt Beverages; and I do hereby declare the following to be a full, clear, and exact description of the invention, such as will enable others skilled in the art to which it appertains to make and use the same.

The invention relates to a novel form of filter for malt beverages; and the object is to provide a simple, practical, and economical filter of this class.

To this end the invention consists in certain features of construction and combination of parts, which will be hereinafter fully set forth.

Figure 1:
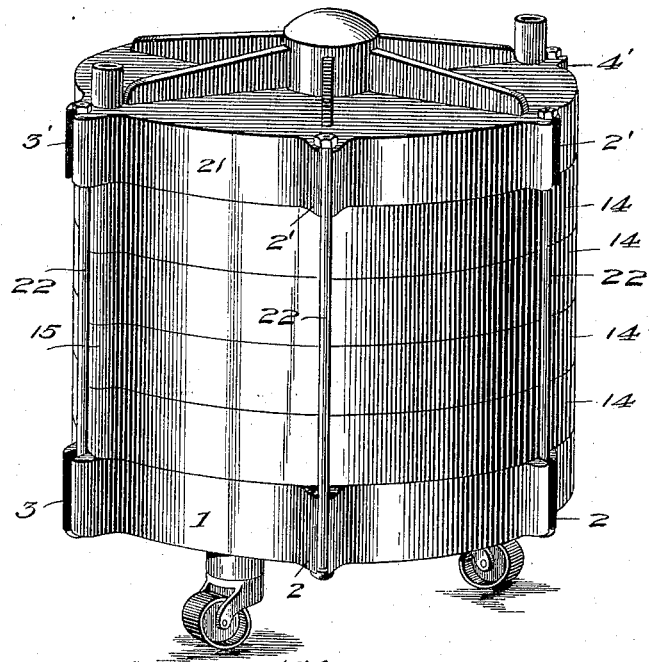
Figure 2:
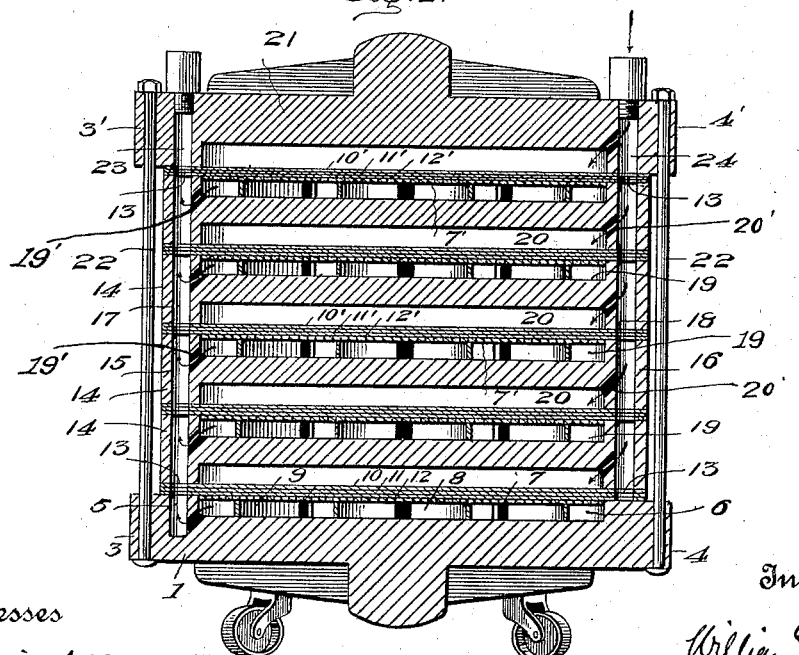

In the accompanying drawings, Figure 1 is a perspective view of my improved filter. Fig. 2 is a transverse section of the same. Fig. 3 is a detail perspective view of one of the intermediate filter frames or pans. Fig. 4 is a similar view of one of the diaphragms, and Fig. 5 is a similar view of one of the filtering-cloths.

1 represents the base, which is provided with a series of supporting-casters for conveniently moving the filter about and with a series of integral vertically-slotted ears 2 2 and a pair of diametrically-disposed ears 3 4, which are also vertically slotted. The ear 3 is formed with a passageway 5, which communicates with an annular pocket or recess 6, formed in the upper face of said base. A foraminous diaphragm 7 is provided with annular mutilated flanges 8 and 9, which form supports upon which it rests in the pockets. 10, 11, and 12 represent a series of filtering-disks which rest upon the diaphragm and form the filtering medium. These disks are made of any well-known porous filtering material, or of felt, or any textile material, and are of different degrees of texture or porosity to accomplish the end in view. When made of textile material, they will serve for packing between the sections or pans. These disks are also provided with orifices 13 13, which form a passage for the liquid between the intervening sections or pans. 14 represents one of these sections or pans, of which there may be an indefinite number to correspond to the capacity of the filter, and these sections or pans are formed with a pair of oppositely-disposed integral lugs 15 and 16, provided with communicating passages 17 and 18, the latter, 18, forming the inlet-passage to the filter and the former, 17, forming the outlet-passage therefrom. Each section or pan is provided with an annular pocket or recess 19 on its upper face and a corresponding pocket or recess 20 on its under or lower face, the passageway 17 communicating with the pocket 19 through the short duct 19' and the passageway 18 communicating with the recess or pocket 20 through the short duct 20'.

A foraminous diaphragm 7', corresponding to the diaphragm 7, is located in the pocket 19 to form a support for the filtering-cloths 10', 11', and 12'.

21 represents the top section, which is provided with the vertically-slotted ears 2' 2', which are alined with the corresponding ears on the base-section to receive the bolts 22 22, which bind the top, base, and intermediate sections firmly together. The ears 3' 4' are also provided with passageways 23 and 24, the former constituting the outlet and the latter the inlet passage, and the course of the liquid may be traced by the arrows in Fig. 2, any given particle of the liquid having to pass only through a single set of filtering-disks between its inflow and outflow.

Although I have specifically described a construction and relative arrangement of the several elements of my invention I do not desire to be confined to the same, as such changes or modifications may be made as clearly fall within the scope of my invention without departing from the spirit thereof.

Having thus described my invention, what I claim, and desire to secure by Letters Patent, is—

A filter comprising top and bottom sections and a series of intermediate sections having communicating inlet and outlet passages, a foraminous diaphragm interposed between said sections, and filtering media supported by said diaphragms and consisting of sections of filtering material of different degrees of porosity, substantially as set forth.

In testimony whereof I affix my signature in presence of two witnesses.

WILLIAM E. FEROE.

Witnesses:
THOMAS B. COTTER,
NELLIE M. FAILEY.